United States Patent [19]
Moore

[11] Patent Number: 5,793,377
[45] Date of Patent: Aug. 11, 1998

[54] METHOD AND APPARATUS FOR POLAR COORDINATE SNAP IN A COMPUTER IMPLEMENTED DRAWING TOOL

[75] Inventor: Kevin D. Moore, Mill Valley, Calif.

[73] Assignee: Autodesk, Inc., San Rafael, Calif.

[21] Appl. No.: 562,176

[22] Filed: Nov. 22, 1995

[51] Int. Cl.⁶ .................................................. G06T 17/00
[52] U.S. Cl. .......................................... 345/433; 345/419
[58] Field of Search ................................... 395/133, 137, 395/140–142, 119, 120, 326, 357; 345/433, 437, 440–442, 419, 420, 326, 357

[56] References Cited

U.S. PATENT DOCUMENTS

| 5,490,241 | 2/1996 | Maugren et al. ......................... 395/140 |
| 5,588,097 | 12/1996 | Ono et al. .............................. 395/137 |

OTHER PUBLICATIONS

"CADVANCE Computer–Aided Design Software", User's Guide, 1992, ISICAD, Inc., pp. 4–15, 4–16, 4–118, 4–119.

3D Home Architect™ for Windows (User's Manual), Brøderbund Software, Inc., 1993. (photocopies of cover page and front/back of the publications's title and pages: 50, 56, 176–179).

Primary Examiner—Almis R. Jankus
Attorney, Agent, or Firm—Merchant, Gould, Smith, Edell, Welter & Schmidt

[57] ABSTRACT

A drawing tool and method having a snap function for constraining items drawn and/or modified to precise angles and precise intervals of polar coordinates is described. Using the drawing tool and method, objects may be drawn or modified at precise angles and intervals in accordance with user settable parameters.

14 Claims, 11 Drawing Sheets

METHOD AND APPARATUS FOR POLAR COORDINATE SNAP IN A COMPUTER IMPLEMENTED DRAWING TOOL

BACKGROUND OF THE INVENTION

1. Field of the Invention

The present invention relates generally to computer implemented systems for drawing and modifying graphical information using polar coordinates, and in particular, to a computer implemented drawing tool and method including a polar coordinate snap function facilitating drawing and modifying objects at precise angles and precise intervals of polar coordinates.

2. Description of the Related Art

Conventional computer implemented drawing tools, such as paint programs, drawing programs, or CAD (computer automated design) programs, use a Cartesian coordinate system to specify locations in the drawing.

Figure 1:
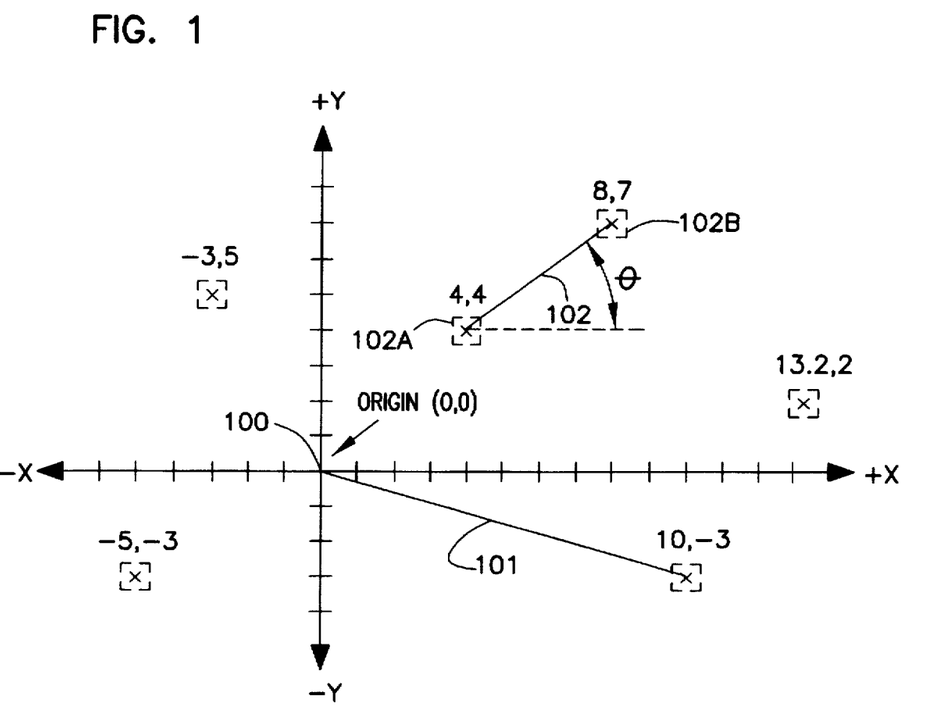
FIG. 1 is a graph illustrating the principals of a coordinate system for specifying location in a drawing program.

As illustrated in FIG. 1, the Cartesian coordinate system specifies location in terms of an x and y position relative to a predefined origin 100. When a new drawing is started, the origin 100 may be set at a predetermined position, for example, the lower-left corner of the window. The origin can typically be set to a desired location by the user. The units of the cartesian coordinate system are typically user specifiable, in various forms. Conventional systems may allow the user to express coordinates in decimal units, for example, to a position of up to 6 digits to the right of the decimal point or in architectural units of feet, inches, meters, etc. The system may allow the user to specify an absolute location using absolute coordinates. When using absolute coordinates, the user specifies the horizontal distance (x) and the vertical distance (y) from the origin, including positive and negative values. In FIG. 1, a line 101 is shown starting at the origin and having its end point expressed in terms of cartesian coordinate values C(10,−3), with the letter C representing the cartesian coordinate system and the value 10 indicating ten units in the positive x direction and the value −3 indicating three units in the negative y direction.

Relative coordinates may also be used in drawing programs to specify a location in terms of its x and y distances relative to a previous point. For example, consider the line 102 extending from point 102A to point 102B. In the absolute cartesian coordinate system, the position of the points are indicated as C(4,4) and C(8,7), respectively. Using a relative coordinate system, the location of point 102A becomes a reference point and point 102B, representing the end of line 102, is specified relative to the location of point 102A. In this system, the point 102B would be specified at a location R(4,3) relative to point 102A, (i.e., the point 102B is 4 units in the positive x direction and 3 units in the positive y direction from point 102A).

A third coordinate system specifies the location of a point in terms of its absolute distance from a previous point and angle relative to a reference axis. This coordinate system is known as a polar coordinate system. In FIG. 1, line 102, may be specified in the polar coordinate system as P(5.36,87) (i.e., a line having a length of 5 units along the line from point 102A at an angle θ equal to approximately 36.87° relative to the reference axis, in this case the positive x axis).

In conventional drawing systems, polar coordinates are used in conjunction with a coordinate display window which displays the polar coordinates of the cursor on the status line of the window as a particular drawing tool is being used. One drawback associated with such conventional drawing systems is that it is difficult to control the cursor movement, using for example, a mouse, to an angle and distance with a desired precision. Conventionally, when high precision is required, the user must manually enter the polar coordinates (i.e., distance and angle) using the keyboard for each object. Thus, in order to create or modify a drawing using precise polar angle and distance measurements, the user must repeatedly enter information using the keyboard.

Snap functions are also known in conventional drawing tools. For example, an orthogonal drawing tool may be provided in a drawing program to constrain lines or move objects in the horizontal and vertical directions only. Such conventional tools have a fixed angle (e.g., 90°) and do not allow the user to prescribe a desired angle value. Thus, the tool is inflexible and can only be used where the fixed angles correspond to a desired angle configuration. When other angles are desired the tool must be disabled and the object is drawn or modified manually or by entering the individual polar coordinate values using the keyboard.

In order to overcome the above drawbacks, the present invention provides a user friendly drawing tool which facilitates drawing using a polar coordinate system.

SUMMARY OF THE INVENTION

It is an object of the instant invention to provide a drawing tool having a polar coordinate "snap" function incorporated therein to facilitate drawing and modifying objects at precise angles and intervals in accordance with user settable parameters.

To achieve the above and other objectives, there is provided a computer implemented method of drawing objects which includes the steps of receiving user selected polar coordinate increment data into the computer and a user generated drawing instruction for drawing or modifying an object. A set of allowable drawing results is defined using the user selected polar coordinate increment data and from that set, one of the acceptable drawing results is selected in correspondence with the received drawing instruction. The object is then drawn or modified to conform to the selected acceptable drawing result. The polar coordinate increment data may include one or both of the polar coordinate parameters, that is, angle increment data used to define a plurality of angles from a reference axis in which the object may be drawn and length increment data used to define length intervals from a starting point in which a line corresponding to the object may be drawn.

In accordance with another aspect of the invention, there is provided a line drawing apparatus which includes a computer having a user interface and a display. The computer further includes means for receiving the user selected polar coordinate increment data into the computer and the user generated drawing instruction for modifying or drawing an object. The apparatus also includes means for defining a set of allowable drawing results using the user selected polar coordinate increment data and selecting an allowable drawing result corresponding to the drawing instruction. The object is then drawn or modified and displayed on the display in accordance with the selected allowable drawing result.

In accordance with another aspect of the invention, there is provided a program storage device which is readable by a computer and which tangibly embodies a program of instructions executed by the computer to perform the steps of receiving the user selected polar coordinate increment data and the user generated drawing instruction to define a set of allowable drawing results based on the user selected polar coordinate increment data and to select from the set of allowable drawing results an allowable drawing result which corresponds to the drawing instruction. The object is drawn or modified to conform to the selected allowable drawing result.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and in which is shown by way of illustration embodiments of the invention. It is understood that other embodiments may be utilized and structural changes may be made without departing from the scope of the present invention.

Figure 2:
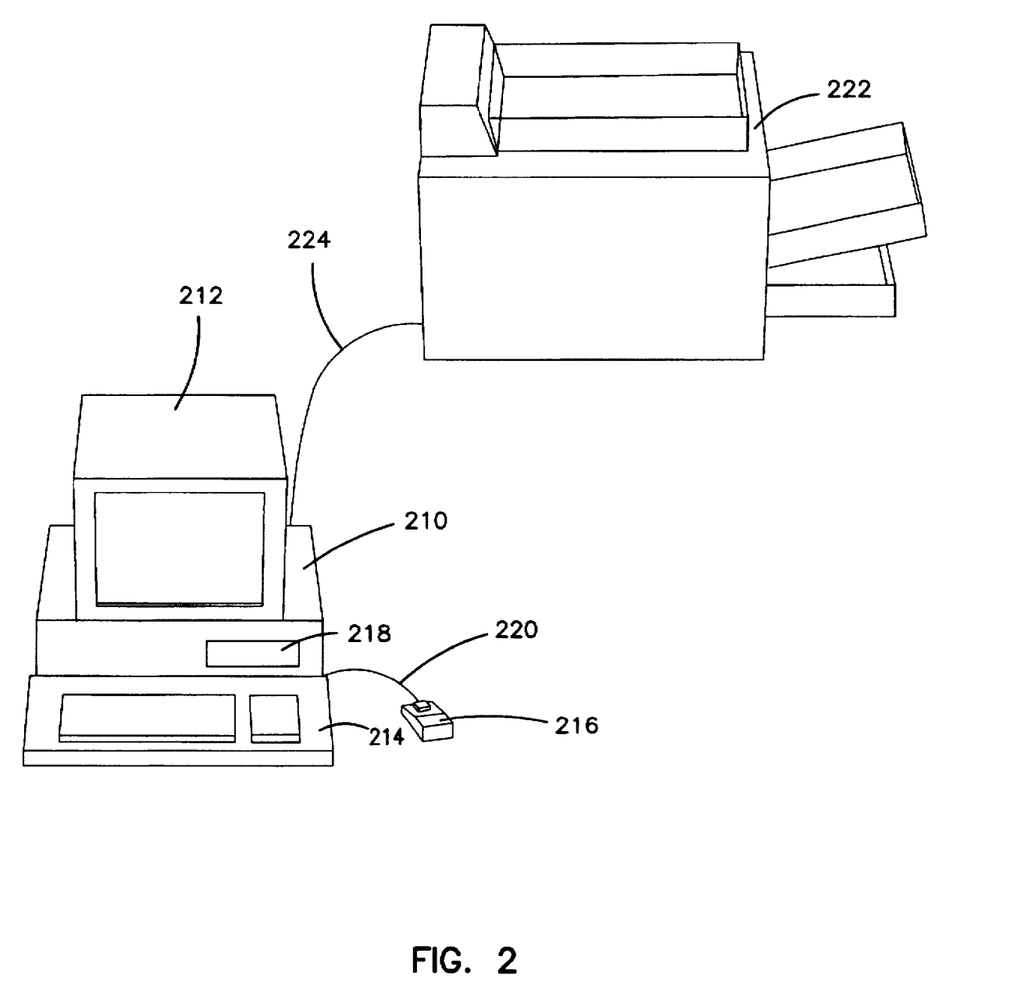
FIG. 2 is a computer system used to implement an embodiment of the invention.

FIG. 2 shows one possible embodiment of the present invention. The present invention comprises a drawing apparatus and method using a polar coordinate "snap" feature implemented on a computer 210. The computer 210 preferably includes a display device 212, keyboard 214, mouse pointing device 216 and disk storage 218. The mouse pointing device 216 is connected to the computer 210 by a connecting cable 220. A printer 222 is attached to the computer 210 by a cable 224. Those skilled in the art will recognize that other pointing and selecting devices may be used in place of the mouse pointing device 216. For example, a trackball, pressure sensor device, pen or tablet interface, may be used. Also, pointing and selecting of data on the display device 212 may be accomplished by devices which use physical contact with the display device 212. Those skilled in the art will also recognize that the display device 212 can be any device capable of presenting information to the user, including cathode ray tube monitors and liquid crystal displays. The elements described in FIG. 2 may also be integrated into a single package, such as a laptop or notebook computer.

A user instructs the computer to draw or modify an object on the display device by selecting an appropriate drawing tool and by manipulating the cursor of the drawing tool using the pointing device. This operation will be collectively referred to as the generation of a drawing instruction. The selected drawing tool may be any type of drawing tool which uses polar coordinates to define a parameter for the tool.

An application program (not shown) executing under the control of an operating system, such as Microsoft® Windows™, UNIX, DOS, etc., is used to implement the drawing system on the computer 210. The application program is typically stored in a portable storage medium such as a magnetic or optical disk. The program is loaded from the portable disk onto a hard drive or other fixed storage device connected to the computer. Under control of the operating system, the application program may be loaded into fast-access, semi-conductor memory such as dynamic or static RAM or a combination of the two for use during actual drawing operations. The application program is tangibly embodied in the computer readable medium and includes instructions, which when executed by the computer, causes the computer to perform the steps necessary to implement the drawing tool described below.

Figure 3:
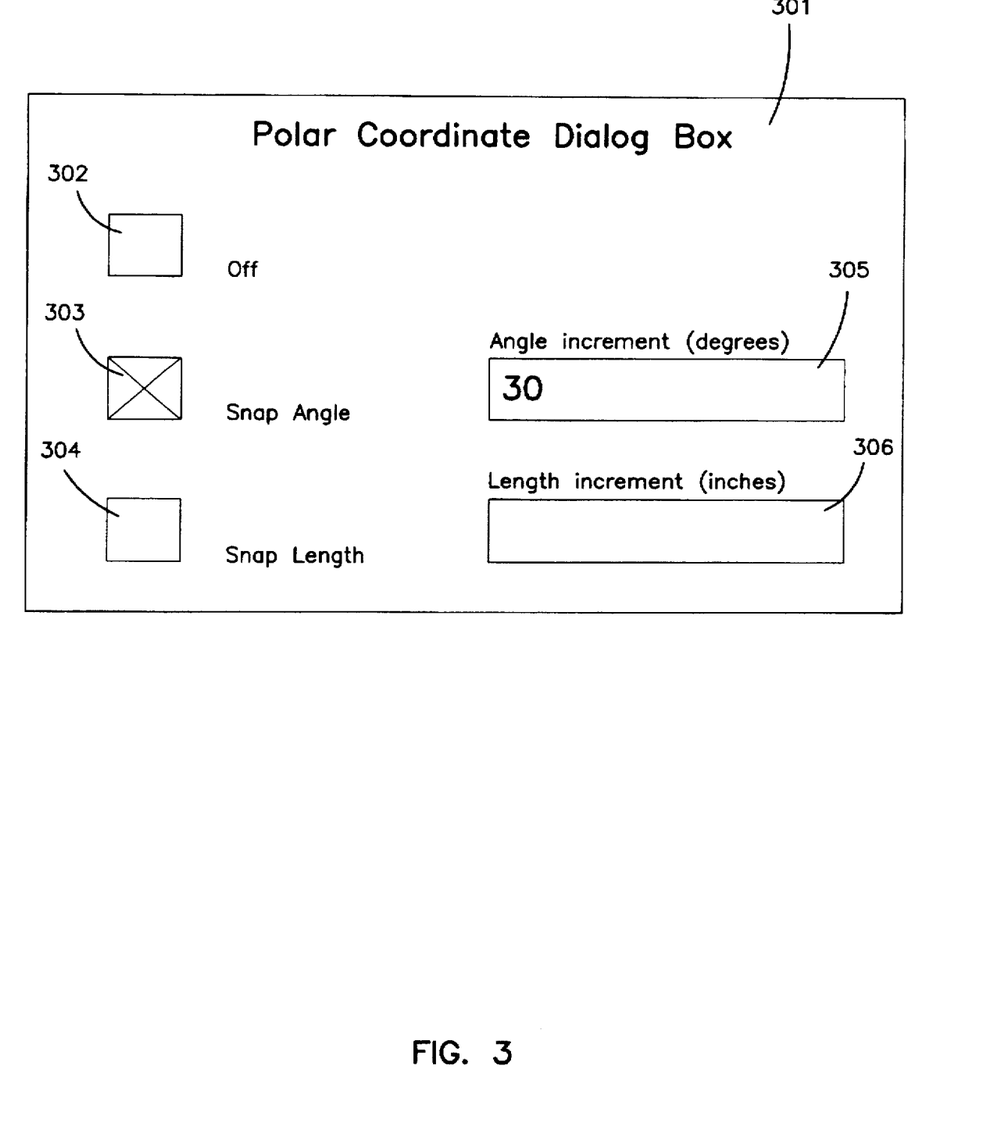
FIG. 3 is a dialogue box used in connection with an embodiment of the invention.

By way of example, FIG. 3 illustrates a dialogue box used to implement the drawing tool in accordance with one embodiment of the invention. As illustrated in FIG. 3, the dialogue box 301 includes a number of option boxes which may be selected by the user. The option box 302 turns off the polar coordinate snap feature of the drawing tool. Box 303 enables the polar coordinate angle snap feature of the drawing tool as more fully described below. Box 304, enables the polar coordinate length snap feature of the drawing tool. In box 305, of the dialogue box 301, a user inputs an angle increment value to be used by the drawing tool. Similarly, in box 306, a user may input a length increment value for use by the drawing tool. In certain circumstances it may be desirable to constrain the allowable increment values which may be entered into the dialogue box 301. For example, the system may limit allowable angle increment values to angles less than or equal to 90° and constrain distance values to positive numbers.

The operation of the drawing tool will now be described. When the snap feature of the drawing tool is turned off in dialogue box 301, the drawing tool operates in the conventional manner described above. For example, the user may manually input the exact desired polar coordinates. When the user enables the snap angle feature using box 303 and inputs an angle increment value in box 305, the drawing tool will be constrained to draw objects at prescribed angles relative to the positive horizontal x axis (i.e., the objects will snap to one of the prescribed angles). The number and magnitude of acceptable drawing angles is determined on the basis of the angle increment value entered in box 305.

In FIG. 3, an angle increment of 30° is input into box 305. Under this condition, when a user moves the cursor of the drawing tool, a line tool for example, to form a line, the line will be constrained to follow a path along one of the prescribed angles. If, for example, the user drags the cursor from a starting point to a position extending away from the starting point, at an angle of approximately 33° with respect to the horizontal positive x axis, the drawing tool will constrain (i.e., "snap") the line being drawn to extend at an angle of 30° with respect to the positive x axis.

Figure 4:
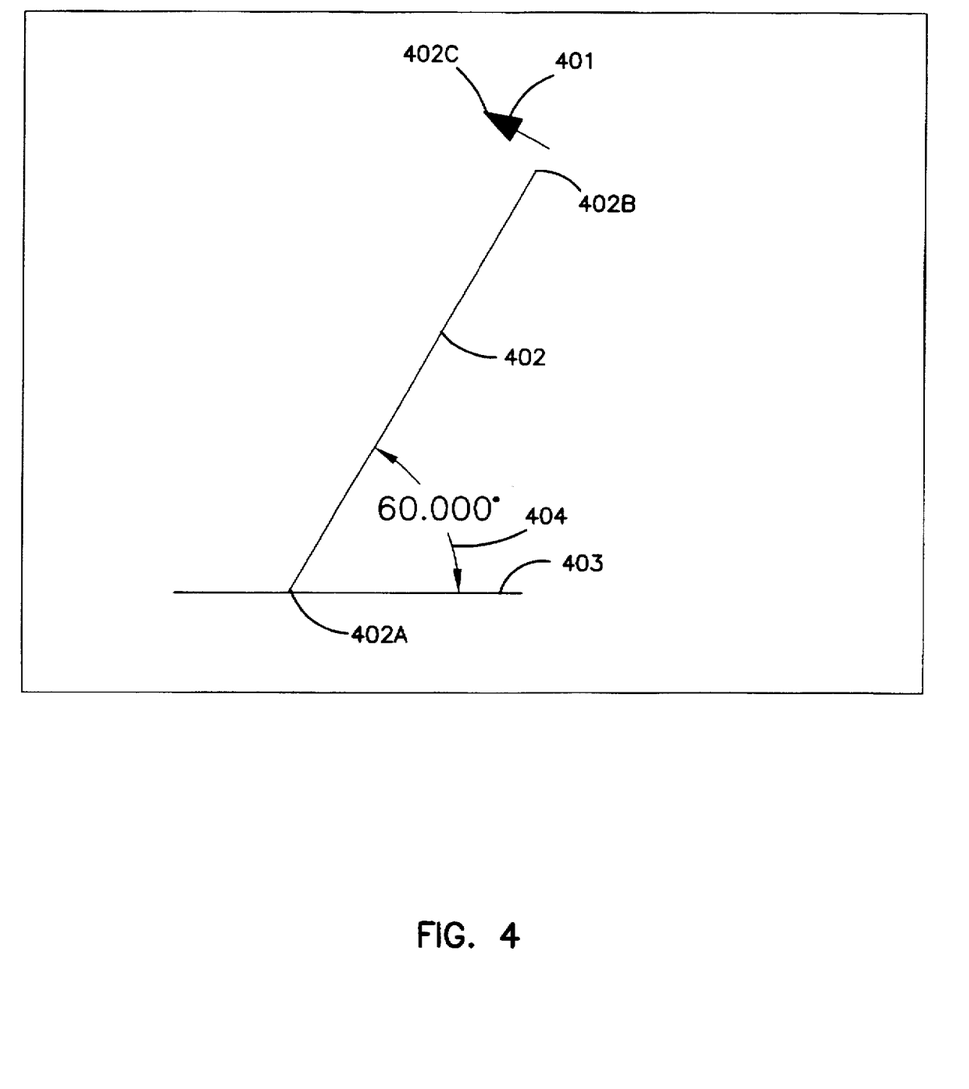
FIG. 4 is an example view illustrating the operation of an embodiment of the invention.

FIG. 4 illustrates a view of the angle snap feature of an embodiment of the invention. The cursor 401 has been moved by the user via the user interface, such as the mouse, from an initial point 402A to the illustrated point 402C. This location represents a location approximately 65° from the horizontal positive x axis 403. Because the snap feature is enabled using the dialogue box 301 (FIG. 3), and the angle increment is specified at 30° in box 305, the drawing tool snaps the line 402 to an angle of 60° from the horizontal x axis. In this manner, the user may precisely draw a line at 60° from the horizontal positive x axis 403 without the requirement of precisely controlling the position 402C of the cursor 401. The user can draw as many lines as desired, each being constrained to angles at increments of 30° from the positive x axis, without further interface with the keyboard of the computer 210.

Figure 5:
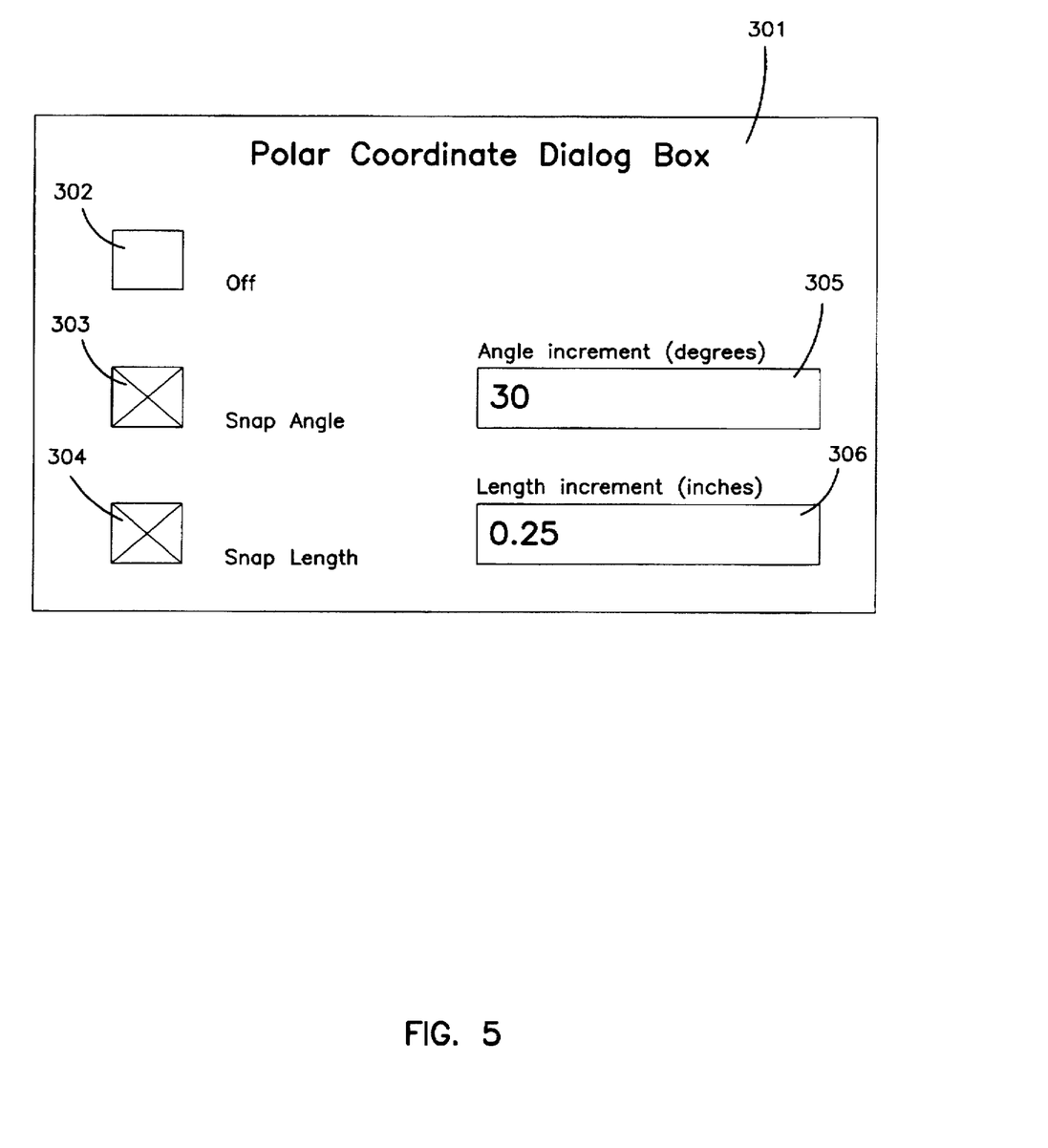
FIG. 5 is another dialogue box illustrating a feature of the invention.
Figure 6:
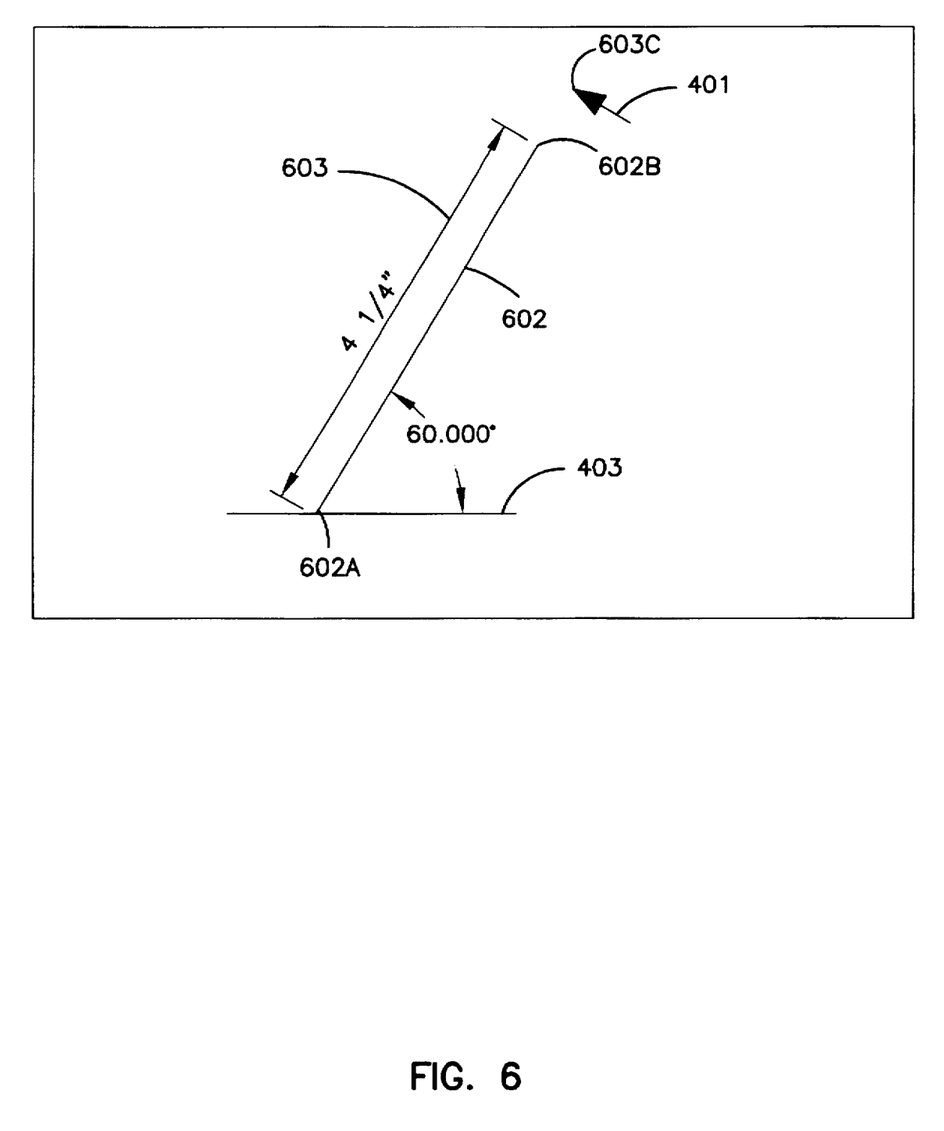
FIG. 6 is another example view of a drawing illustrating the features of an embodiment of the invention.

FIG. 5 illustrates the dialogue box 301 having both the snap angle box 303 and snap length box 304 both selected. In addition to the 30° angle increment entered in the angle increment box 305, a length increment of 0.25" is entered into the length increment box 306. The length increment constrains the polar coordinate length of a line drawn using the drawing tool, for example, to an integer multiple of the increment entered. An example of the length snap feature is illustrated in FIG. 6. The user drags the cursor 401 from an initial point 602A to a point approximately 4.35" from the point 602A. The drawing tool causes the line 602 to be drawn having a length 603 of 4.25". In FIG. 6, the angle is also drawn at one of the acceptable angles (i.e., 60° as indicated by the snap angle increment of 30° entered in box 304 of the dialogue box 301).

Figure 7:
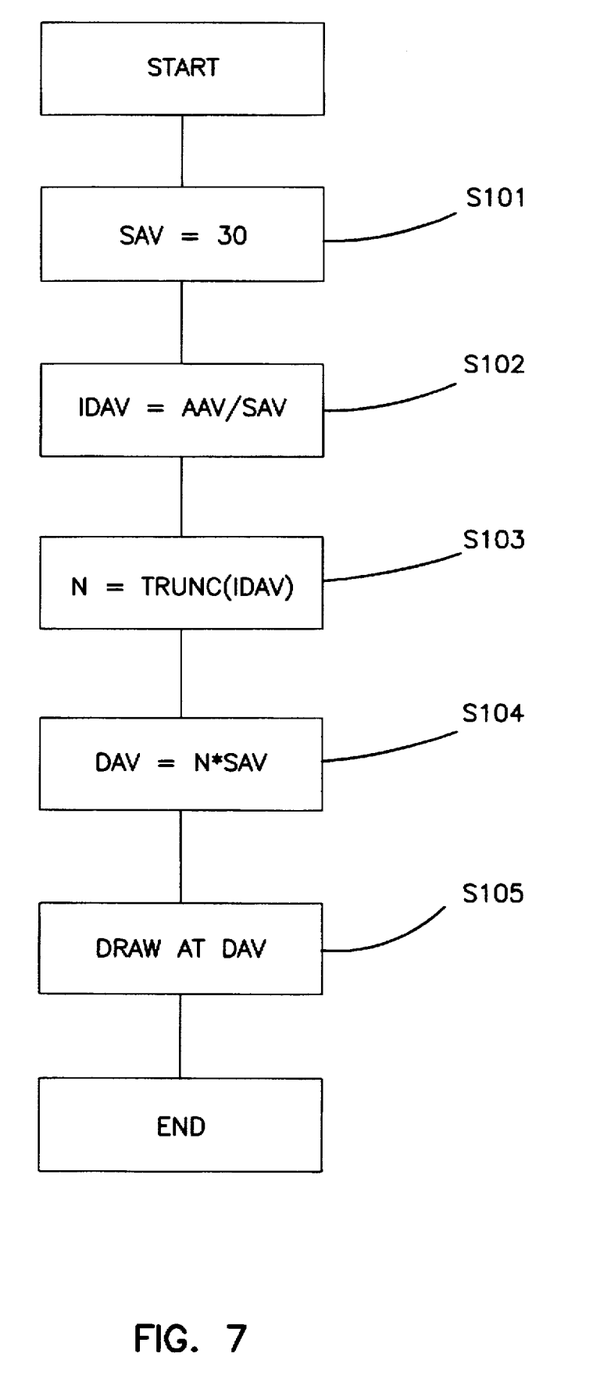
FIG. 7 is a flow chart illustrating the operation of an embodiment of the invention.

FIG. 7 illustrates an operational flow of a drawing tool implemented according to an embodiment of the invention. At step S101, a set angle value SAV is set to the angle value entered in the angle increment box 305 of the dialogue box 301 (e.g., 30°). At step S102, an intermediate drawing angle value IDAV is calculated by dividing the actual angle value AAV of the cursor location with respect to the positive x axis by the set angle value SAV. At step S103, the intermediate drawing angle value IDAV is truncated to produce an integer value N.

The integer value N is used in step S104 to produce a drawing angle value DAV. The drawing angle value DAV is equal to the integer value N multiplied by the set angle value SAV. The calculated drawing angle value DAV is used by the drawing tool as a "snap" angle at step S105. In this manner, the object drawn using the drawing tool is "snapped" to an angle which is an integer multiple of the increment of the set angle value SAV.

By way of example, if the actual angle value AAV of the cursor 401 is approximately 65° with respect to the horizontal x axis as illustrated in FIG. 4, and the set angle value SAV is 30°, the intermediate drawing angle value IDAV would be equal to 2.17 (i.e., 65/30). Truncating this value at step S103 yields an integer value N=2. At step S104, a drawing angle value DAV of 60° is calculated by multiplying the integer value N=2 by the set angle value of 30° (i.e., 2*30=60). Accordingly, as illustrated in FIG. 4, when a line drawing tool is used with the polar angle snap feature of the invention, the line is drawn at an angle value of 60° even though the cursor is moved by the user to an angle of 65°.

Figure 8:
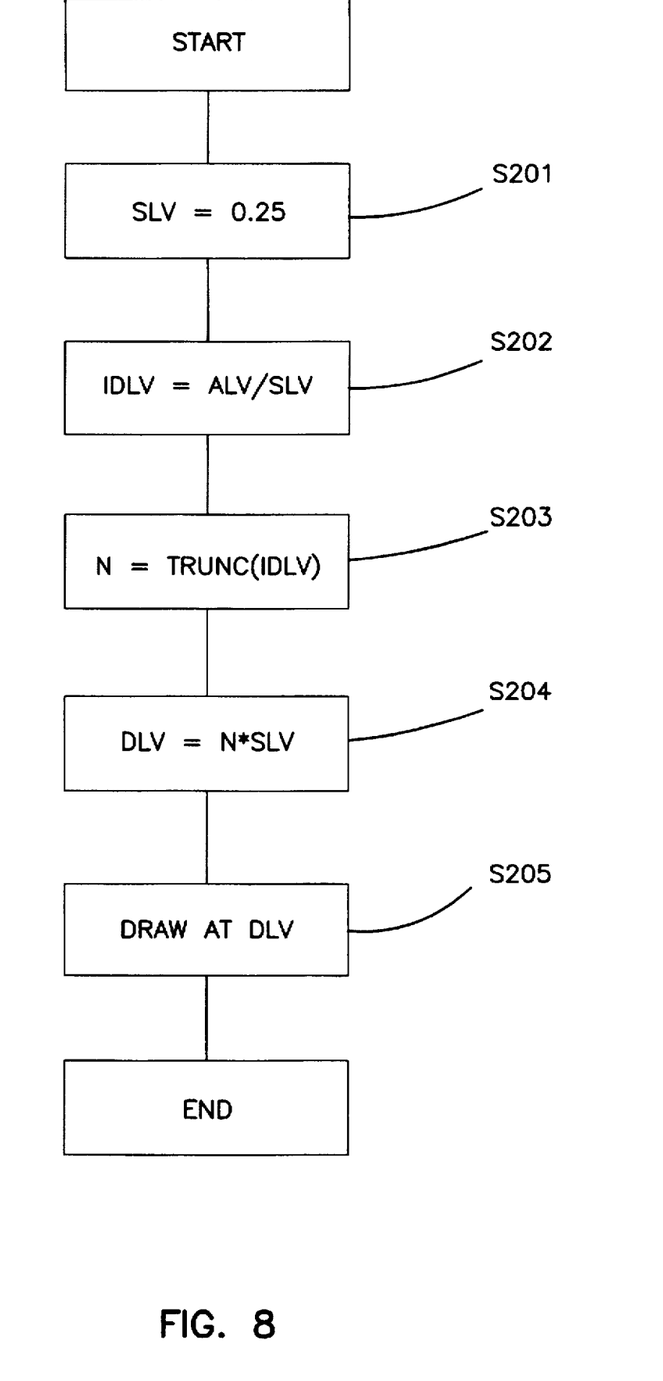
FIG. 8 is another flow chart illustrating the operation of another feature in accordance with embodiment of the invention.

FIG. 8 illustrates an operational flow of the drawing tool according to the invention when an increment value is set in the length increment box 306 of dialogue box 301 to constrain the length component of the polar coordinate of an object being drawn with the drawing tool. At step S201, a set length value SLV is set equal to the value entered in the length increment box 306 of the dialogue box 301. At step S202, an actual length value ALV, which is the actual distance between the origin point of the polar coordinate and the cursor, is divided by the set length value SLV to produce an intermediate drawing length value IDLV. At step S203, an integer value N is calculated by truncating the intermediate drawing length value IDLV. At step S204, a drawing length value DLV is calculated by multiplying the set length value SLV by the integer value N. At step S205, the drawing tool uses the drawing length value DLV as the length component of the polar coordinate values for an object being drawn with the drawing tool.

By way of example, the increment values entered in the dialogue box 301 of FIG. 5 are used with a line drawing tool used to draw the line illustrated in FIG. 6. The set length value SLV is set to 0.25 at step S201. An intermediate drawing length value INTDLV is calculated by dividing the actual length value ALV equal to 4.45" in FIG. 6, by the set length value SLV (i.e., INTDLV=4.45/0.25). The calculated intermediate drawing length value IDLV is equal to 17.8. At step 203, the intermediate drawing length value INTDLV is truncated to the integer value N (i.e., N=17). At step 204, a drawing length value DLV is calculated by multiplying the set length value SLV (0.25) by the integer value N(17) to produce a drawing length value DLV of 4.25. At step S205, a line 602, illustrated in FIG. 6, is drawn at a length of 4.25". The line is also constrained to an angle of 60° with respect to the positive x axis as a result of the angle increment value of 30 entered in the angle increment box 305.

Figure 9:
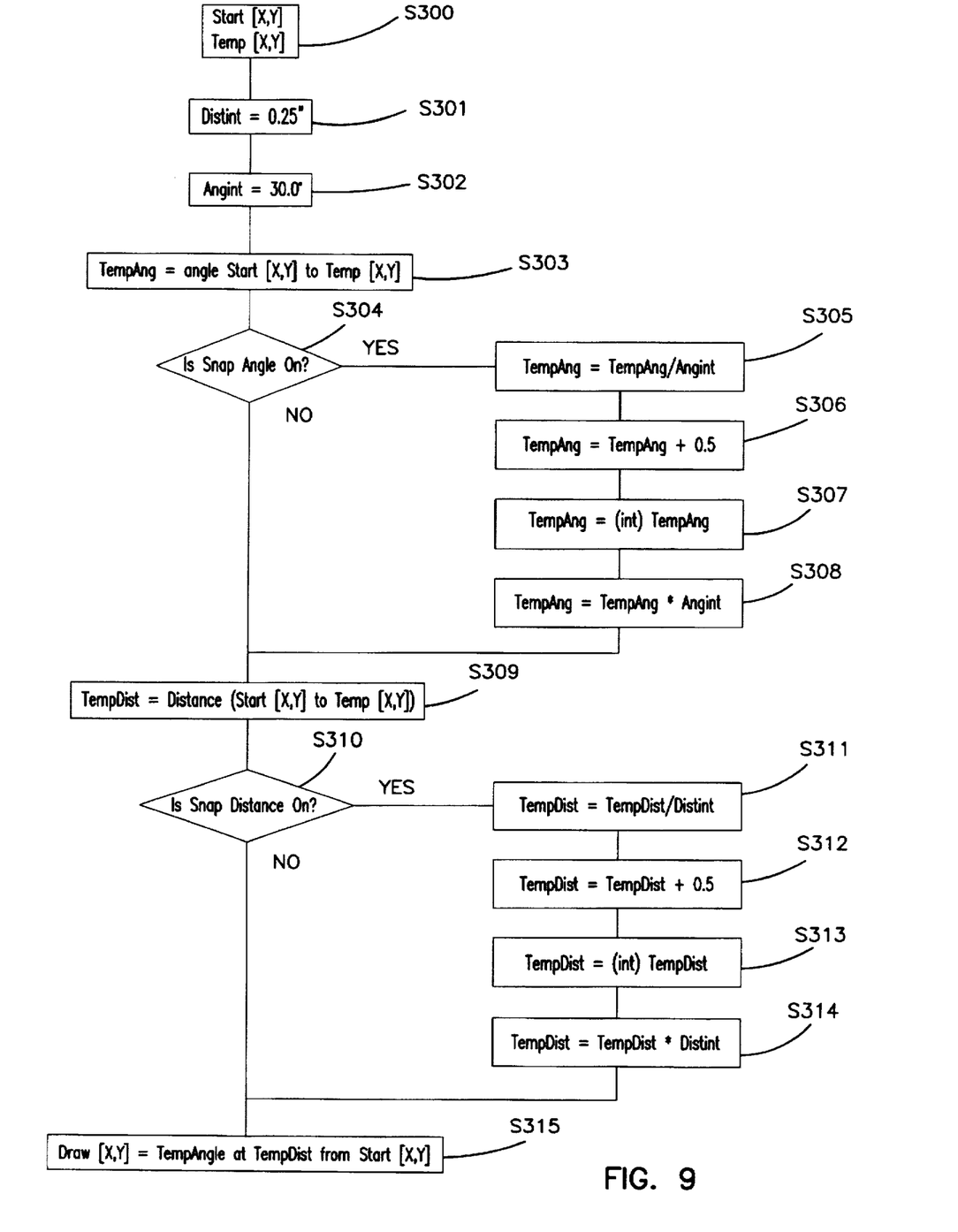
FIG. 9 is a flow chart depicting the operation of an alternative embodiment of the invention.

In the above described operation, the "snap" values for the polar coordinates are always truncated from the values of the actual cursor location. As a result, objects drawn with the "snap" values will always be drawn using a polar coordinate value less that the actual position of the cursor even when the cursor position is closer to a larger integer multiple of the polar coordinate increment value. For example, if the length increment is set at a value of 2" and if the user uses a line drawing tool and drags the cursor to a position 3.95" from the origin, the length of the drawn line will be "snapped" to 2". In certain instances it may be desirable to have the object "snap" to the closest acceptable drawing position (i.e., integer multiple of the increment value). In FIG. 9 another embodiment of the invention is illustrated where the object is "snapped" to the closest acceptable position with respect to the increment values.

At step S300 of FIG. 9, a starting point Start[X,Y] for an object to be drawn and the current location of the cursor Temp[X,Y] is retrieved. At step S301, a distance interval value DistInt is set equal to the distance increment value entered in the dialog box 301. In the example illustrated in FIG. 5, the value DistInt is set equal to 0.25". At step S302, an angle interval value AngInt is set to the angle increment value entered in the dialog box 301. In the illustrated example, the value AngInt is set equal to 30.0°.

At step S303, an angle value TempAng, which is to be used to actually draw the object, is initially calculated on the basis of the starting point Start[X,Y] and the location of the cursor Temp[X,Y]. Next, at S304, it is determined whether the snap angle function is enabled. If not, the initially calculated angle value TempAng will be used by the system to draw the object at an angle corresponding to the actual position of the cursor Temp[X,Y].

If at step S304 it is determined that the snap angle feature is enabled, the system proceeds to step S305. Steps S305 through S308 performing a rounding operation on the angle value TempAng equal to the appropriate multiple of the angle increment. At step S305, the system sets the value of TempAng to a value representing the approximate number of angle intervals represented by the actual angle value initially calculated as the value TempAng. This is done by setting the value TempAng equal to the ratio of the initially calculated value TempAng and the angle interval value AngInt. At step S306, a value of 0.5 is added to the value TempAng calculated at step S305. At step S307, the new value of TempAng is then truncated to a whole number. At step S308, the value TempAng is then set to the product of the truncated value TempAng and the angle increment AngInt such that the value of TempAng is now rounded to the nearest integer multiple of the angle increment AngInt.

Using the examples provided in connection with FIGS. 3 and 4, an exemplary operation of the angle rounding process will be described. Using the starting point Start[X,Y] and the location of the cursor Temp[X,Y] an initial angle value of 65° is calculated at step S303 (i.e., TempAng=65°). When the snap angle function is enabled, at step S305 the TempAng value is set equal to 2.2 (i.e., 65°÷30°=2.2). At step S303, the value of 0.5 is added to the value of TempAng previously calculated to obtain a TempAng value of 2.7 (i.e., 2.2+0.5=2.7). At step S307, the TempAng value 2.7 is truncated to a whole number of 2.0. At step S308, the TempAng value 2.0 is multiplied by the angle increment AngInt value of 30° to finally set the TempAng value equal to a rounded value of 60°.

Upon completion of step S308 or when the snap angle feature is not enabled at step S304, the system proceeds to step S309. At this step, a distance TempDist from the starting point Start[X,Y] to the location of the cursor Temp [X,Y] is calculated. At step S310, it is determined whether the snap distance function is enabled. If the snap distance function is enabled, the system proceeds to step S311. Otherwise the calculated distance TempDist will be used at step S315.

At step S311, the value of TempDist is set equal to the ratio of the calculated value TempDist and the distance interval DistInt to obtain a value representing the number of multiples of the distance interval at which the cursor location Temp[X,Y] resides from the starting point Start [X,Y]. At step S312, a value of 0.5 is added to the TempDist to produce a new value of TempDist. At step S313, the value of TempDist is truncated to a whole number. Finally, at step S314, the value of TempDist is multiplied by the distance interval DistInt to obtain a rounded value of TempDist which is an integer multiple of the distance interval DistInt.

For purposes of illustration, consider an initially calculated distance from the starting point Start[X,Y] to the cursor location Temp[X,Y] of 4.45". When the snap feature is enabled, at step S311, the value of TempDist is divided by the distance interval to produce a value of 17.8 (i.e., 4.45"÷0.25"). At step S312, the TempDist value is set equal to TempDist plus 0.5, which is a value of 18.3 (i.e., 17.8+0.5). At step S313, the value of 18.3 is truncated to set the value of TempDist to a value of 18. Finally, at step S314, the value of TempDist is set equal to the value of TempDist multiplied by the distance interval DistInt to produce a final value TempDist equal to 4.5" (i.e., 18*0.25"=4.5").

From step S310 or step S314, the system proceeds to step S315 where a drawing coordinate, Draw[X,Y] is calculated using the values TempDist and TempAng as polar coordinates from the starting point Start[X,Y]. As can be appreciated, this new point may or may not be the same as the cursor location depending upon whether the various snap angle features are enabled, as well as the relative location of the cursor.

Figure 10:
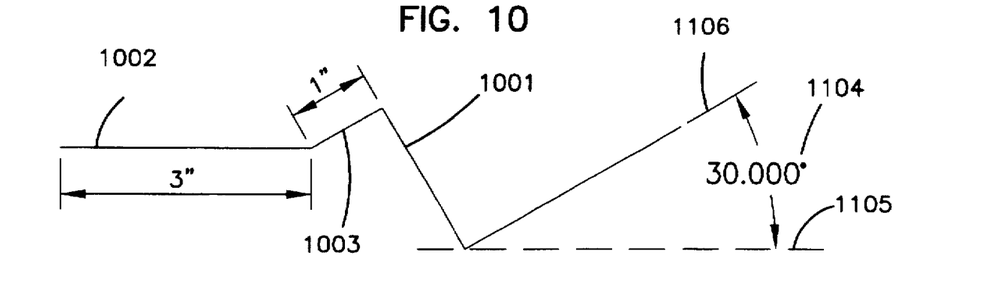
FIG. 10 is a drawing illustrating another embodiment of the invention.

In the above description, the invention has been described in connection with examples using a line drawing tool for ease of illustration. However, the invention is not limited to a specific drawing tool. Rather, the polar coordinate snap feature can be implemented in conjunction with any drawing tool used to create or modify objects whose function can be implemented using polar coordinates to set parameters of the drawing or function. For example, a polyline drawing tool used to draw a series of connected lines having pivot angles as illustrated in FIG. 10 may have the polar snap function incorporated therein. The polar coordinate snap features of the invention may be used to constrain the length of lines between pivot points and the angles relative to a reference axis for the various pivot points connecting the line segment generated using the polyline drawing tool. In FIG. 10, a connected line 1001 is generated using a polyline tool having the polar coordinate feature of the instant invention enabled with a line length increment of 1" and an angle increment of 30°. As illustrated, the lengths of the various line segments of the figure are constrained to be integer multiples of 1". Line segment 1002 has a length of 3" and line segment 1003 has a length of 1". In addition, the angles of the lines are constrained to 30° increments relative to the positive x axis 1005. For example, line segment 1006 has an angle 1004 of 30° with respect to the x axis.

Figure 11:
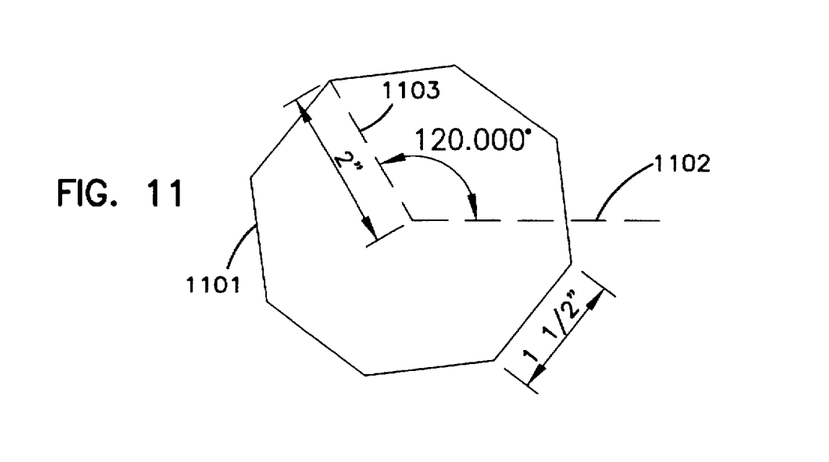
FIG. 11 is another drawing illustrating still another embodiment of the invention.

In FIG. 11, a closed eight-sided polygon figure is illustrated. The polygon is drawn using a polygon drawing tool implemented with a polar coordinate snap feature of the present invention. Line 1102 represents the positive horizontal x axis. Line 1103 illustrates a control line which the cursor drags when the forming the polygon 1101 using the polygon drawing tool. The angular orientation of the polygon 1101 is determined by the angular orientation of the control line 1103. Moreover, the size of the polygon is determined by the length of the control line. In this manner, the polar coordinates of the control line 1103 (i.e., angle and length) determine the size and orientation of the polygon. It is understood that the control line 1103 is used to draw the object but is not part of the object as drawn (i.e., when the object is drawn, the control line 1103 is not shown). As illustrated in FIG. 11, the control line 1103 is constrained by settings in the polar coordinate dialogue box 301 to polar coordinate increments of 30° in angle and 1" in length. Accordingly, polygons may be drawn using the tool constrained in size by the length increment, with an angular orientation constrained to angular increments relative to the positive x axis 1102. The polygon 1101 drawn, was created by moving the cursor to a position where the angle snapped to 120° and the length of the control line was 2". In this manner, a polygon 1101 having side lengths of 1½" was produced.

Figure 12:
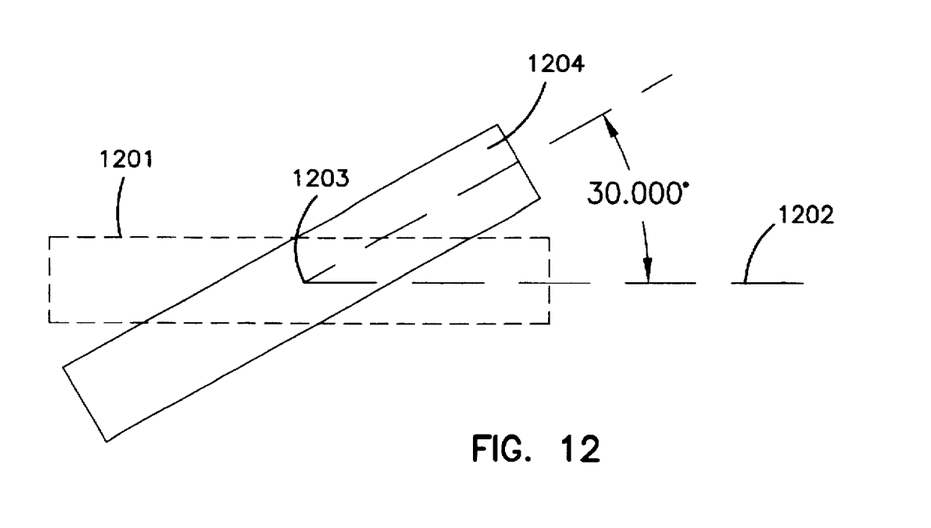
FIG. 12 is a drawing representing another embodiment of the invention.

The polar coordinate snap function of the claimed invention may also be used in connection with tools used to modify features already drawn. As illustrated in FIG. 12, a box FIG. 1201 was initially drawn along the horizontal x axis 1202. A rotating tool was selected to rotate the box around a selected point 1203. When the polar coordinate snap feature is enabled, constraining the acceptable angles to 30° increments, the rotation of the box to the position illustrated by the solid line 1204 is constrained. In this manner, when the rotation tool is used, the box can only be rotated through prescribed angles.

Figure 13:
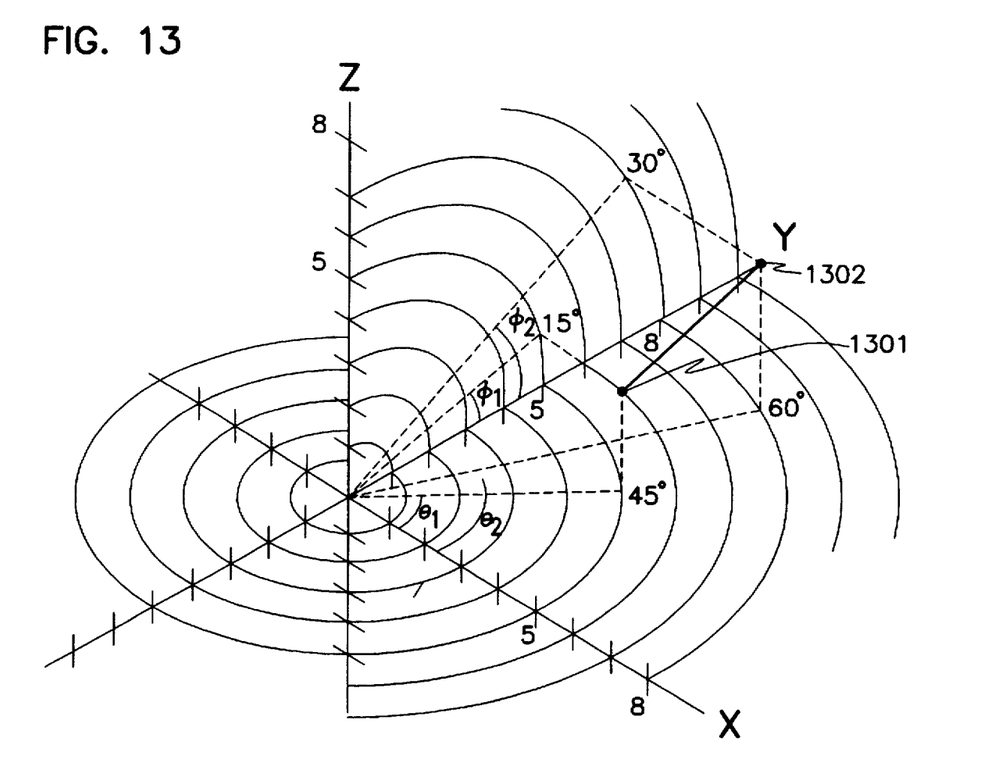
FIG. 13 is a three dimensional coordinate system for illustrating yet another embodiment of the invention.

While the above described illustrations of various embodiments of the invention are explained in connection with a two-dimensional (2D) drawing system, the present invention may also be used in a three dimensional (3D) system. A 3D polar type coordinate system (i.e., a spherical coordinate system) is illustrated in FIG. 13. In such a system, a point's location may be specified as a distance d from an origin point, defined in terms of a user coordinate system (UCS), an angle θ from the X-axis (in the XY plane) and an angel φ from the XY plane. The coordinate for point P may be designated as P(d,θ,φ). As in the 2D polar coordinate system, when drawing an object the operation of the drawing tool may be specified relative to a first point $P_1(d,\theta,\phi)$ in terms of coordinates for a second point $P_2(d,\theta,\phi)$ having its distance and angles measured relative to the first point.

In FIG. 13, a first point 1301 may be specified as $P_1$ (5,45°,15°). The second point 1302 may be specified in absolute terms from the origin of the UCS as $P_{2(abs)}$ (8,60°, 30°) or in relative terms from the first point 1302 as $P_{2(rel)}$ (3,15°,15°). As can be appreciated, the polar coordinate snap feature described above may be implemented in a 3D system to constrain the distance d and angles θ and φ to prescribed increments. In practice, most drawing systems allow for coordinate input via the user interface drawing tool in only two dimensions. In such a system the user is first required to establish a drawing plane in the UCS. In this manner, the user may draw in 3D space using a 2D input device and the polar coordinate snap feature as though it were being used in a 2D system by snapping angles relative to the defined drawing plane.

As can be seen from the above examples, the polar coordinate snap function of the described invention can be implemented for use with a variety of different drawing tools and functions as will be evident to those of skill in the art after reviewing the above description of the invention. The invention encompasses drawing tools which are used to create an initial drawing, as well as tools which are used to modify the drawing in a prescribed manner in accordance with polar coordinate values. The foregoing description of various embodiments of the invention has been presented for purposes of illustration and description. It is not intended to be exhaustive or to limit the invention to the precise form disclosed. Many modifications and variations are possible in light of the above teaching. It is intended that the scope of the invention be limited not by this detailed description, but only by the claims appended hereto.

What is claimed is:

1. A computer implemented method of drawing objects comprising the steps of:
   receiving user selected polar coordinate increment data into the computer;
   receiving in the computer a user generated drawing instruction for drawing or modifying an object in a three-dimensional space defined by an intersection of three axes defined by a reference axis and two axes of a reference plane;
   defining a set of allowable drawing results based on the user selected polar coordinate increment data;
   selecting from the set of allowable drawing results an allowable drawing result corresponding to the drawing instruction;
   drawing or modifying the object to conform to the selected allowable drawing result; and
   the user selected polar coordinate increment data comprising first angle increment data and second angle increment data, the first angle increment data defining a plurality of allowable angles from the reference axis for a first angular component of polar coordinates for the object, the second angle increment data defining a plurality of allowable angles from the reference plane, and the plurality of allowable angles from the reference plane providing a second angular component of coordinates for the object.

2. A method as recited in claim 1, wherein the user selected polar coordinate increment data comprises length increment data defining allowable length intervals for a length component of polar coordinates for the object.

3. A method as recited in claim 1, wherein the user selected polar coordinate increment data further comprises length increment data defining allowable length intervals for a length component of polar coordinates for the object, the set of allowable drawing results being defined by polar coordinates defining a set of lines extending from the starting point at one of the plurality of angles and having a length which is an integral multiple of the length increment data.

4. A method as recited in claim 1, wherein the selecting step comprises the step of selecting from the set of allowable drawing results an allowable drawing result having polar coordinates which most closely match polar coordinates of the drawing instruction.

5. A line drawing apparatus comprising:
   a computer, including a user interface and a display device;
   means for receiving user selected polar coordinate increment data into the computer;
   means for receiving in the computer a user generated drawing instruction for drawing or modifying an object in a three-dimensional space defined by an intersection of three axes defined by a reference axis and two axes of a reference plane;
   means for defining a set of allowable drawing results based on the user selected polar coordinate increment data;
   means for selecting from the set of allowable drawing results an allowable drawing result corresponding to the drawing instruction;
   means for drawing or modifying the object on the display to conform to the selected allowable drawing result; and
   the user selected polar coordinate increment data comprising first angle increment data and second angle increment data, the first angle increment data defining a plurality of allowable angles from the reference axis for a first angular component of polar coordinates for the object, the second angle increment data defining a plurality of allowable angles from the reference plane, and the plurality of allowable angles from the reference plane providing a second angular component of coordinates for the object.

6. An apparatus as recited in claim 5, wherein the user selected polar coordinate increment data comprises length increment data defining allowable length intervals for a length component of polar coordinates for the object.

7. An apparatus as recited in claim 5, wherein the user selected polar coordinate increment data further comprises length increment data defining allowable length intervals for a length component of polar coordinates for the object, the set of allowable drawing results being defined by polar coordinates defining a set of lines extending from the starting point at one of the plurality of angles and having a length which is an integral multiple of the length increment data.

8. An apparatus as recited in claim 5, wherein the means for selecting comprises means for selecting from the set of allowable drawing results an allowable drawing result having polar coordinates which most closely match polar coordinates of the drawing instruction.

9. An apparatus as recited in claim 5, wherein the user interface comprises at least one of a trackball, pressure sensor device, pen, a tablet interface and a physical contact interface.

10. A program storage device, readable by a computer having a memory, tangibly embodying a program of instruction executable by the computer to perform the steps of:

receiving user selected polar coordinate increment data into the computer;

receiving in the computer a user generated drawing instruction for drawing or modifying an object in a three-dimensional space defined by an intersection of three axes defined by a reference axis and two axes of a reference plane;

defining a set of allowable drawing results based on the user selected polar coordinate increment data;

selecting from the set of allowable drawing results an allowable drawing result corresponding to the drawing instruction;

drawing or modifying the object to conform to the selected allowable drawing result; and the user selected polar coordinate increment data comprising first angle increment data and second angle increment data, the first angle increment data defining a plurality of allowable angles from the reference axis for a first angular component of polar coordinates for the object, the second angle increment data defining a plurality of allowable angles from the reference plane, and the plurality of allowable angles from the reference plane providing a second angular component of coordinates for the object.

11. A program storage device as recited in claim 10, wherein the user selected polar coordinate increment data comprises length increment data defining allowable length intervals for a length component of polar coordinates for the object.

12. A program storage device as recited in claim 10, wherein the user selected polar coordinate increment data further comprises length increment data defining allowable length intervals for a length component of polar coordinates for the object, the set of allowable drawing results being defined by polar coordinates defining a set of lines extending from the starting point at one of the plurality of angles and having a length which is an integral multiple of the length increment data.

13. A program storage device as recited in claim 10, wherein the selecting step comprises the step of selecting from the set of allowable drawing results an allowable drawing result having polar coordinates which most closely match polar coordinates of the drawing instruction.

14. A program storage device as recited in claim 10, wherein the computer readable memory comprises one of a portable magnetic storage medium, a portable optical storage medium, a fixed optical storage medium, a fixed magnetic storage medium, and a semiconductor memory.

* * * * *